US006485090B1

United States Patent
Pätz et al.

(10) Patent No.: US 6,485,090 B1
(45) Date of Patent: Nov. 26, 2002

(54) MOTOR VEHICLE ROOF WITH ADJUSTABLE CLOSURE ELEMENT

(75) Inventors: Werner Pätz, Hofstetten (DE); Thomas Ganz, Stockdorf (DE); Helmut Teschner, Finning (DE); Reinhard Wecker, Eichenau (DE)

(73) Assignee: Webasto Vehicle Systems International GmbH, Stockdorf (SE)

( * ) Notice: Subject to any disclaimer, the term of this patent is extended or adjusted under 35 U.S.C. 154(b) by 0 days.

(21) Appl. No.: 09/631,992

(22) Filed: Aug. 3, 2000

(30) Foreign Application Priority Data

Aug. 6, 1999 (DE) .......................... 199 37 220

(51) Int. Cl.⁷ ................................. B60J 7/04
(52) U.S. Cl. ...................... 296/214; 296/211
(58) Field of Search ................. 296/211, 214

(56) References Cited

U.S. PATENT DOCUMENTS 4,717,199 A   1/1988  Kohlpaintner et al. ...... 296/214
5,002,334 A * 3/1991  Meiler et al. ............... 296/214
5,154,481 A  10/1992  Paetz et al. ................. 296/211

FOREIGN PATENT DOCUMENTS

DE   38 30 484    3/1989
EP   0 448 807   10/1991

* cited by examiner

Primary Examiner—Dennis H. Pedder
(74) Attorney, Agent, or Firm—Nixon Peabody LLP; David S. Safran

(57) ABSTRACT

A motor vehicle roof with a roof opening which can be closed or at least partially exposed by a displaceable closure element (10) which has an electrical element (12), an displaceable headliner part (20) for concealing the closure element and at least one coupling element (18) which acts as a driver to entrain the headliner part in the displacement motion of the closure element. The coupling element furthermore provides for electrical contact between the electrical element of the closure element and a contact element (32) which is provided on the headliner part to establish electrical contact between the electrical element of the closure element and a vehicle-mounted electrical element.

15 Claims, 1 Drawing Sheet

MOTOR VEHICLE ROOF WITH ADJUSTABLE CLOSURE ELEMENT

BACKGROUND OF THE INVENTION

1. Field of the Invention

This invention relates to a motor vehicle roof with a roof opening which can be closed or at least partially exposed by an adjustable closure element which has an electrical element, and an adjustable headliner element coupled thereto for concealing the closure element.

2. Description of Related Art

Published German Patent Application No. DE 38 30 484 A1 discloses a sliding roof for a motor vehicle in which a sliding cover which can be moved in a guide rail in the lengthwise direction of the roof and which is provided with solar cells is provided with sliding contacts which are in electrical contact with a roof-mounted contact rail in order to provide for electrical connection between the solar cells of the sliding cover and the motor vehicle battery.

European Patent No. 0 488 807 discloses a motor vehicle roof with a raisable cover, underneath which there is a sliding headliner which can be moved independently of the cover in the lengthwise direction of the roof and which is provided with one or more electrical fans. The cover is provided with a solar generator and with a front and a back contact opening into which corresponding contact pins for the fans on the sliding headliner can make contact in order to provide the fans of the sliding headliner with solar current from the cover.

U.S. Pat. No. 4,717,199 discloses a motor vehicle roof with a movable and a raisable opaque cover, underneath which a opaque headliner part is mounted by means of a coupling arrangement such that the headliner part is entrained in the displacement motion of the cover. The coupling arrangement comprises two pairs of a cover-mounted driving pin and a headliner-mounted driving catch part. When the cover is installed, the headliner part is locked to the cover by means of the coupling arrangement. The driving catch part is made to be able to swivel to a certain extent in order to facilitate vertical adjustment and to allow a certain relative motion between the cover and the headliner part when the cover is being displaced.

SUMMARY OF THE INVENTION

The object of this invention is to devise a motor vehicle roof with a displaceable closure element which has an electrical element, and a headliner part which is entrained by the closure element during displacement via a coupling element, and in which electrical contact between the electrical element of the closure element and a vehicle-mounted electrical element is easily established.

This object is achieved in accordance with the invention by a motor vehicle roof with a roof opening which can be closed or at least partially exposed by an displaceable closure element which has an electrical element, a displaceable headliner part for concealing the closure element and at least one coupling element which acts as a driver in order to entrain the headliner part in the displacement of the closure element, and furthermore provides for electrical contact between the electrical element of the closure element and a contact element which is provided on the headliner part to establish electrical contact between the electrical element of the closure element and a vehicle-mounted electrical element.

In this approach according to the invention, it is advantageous that, when the headliner part is installed, electrical contact is automatically established between the electrical element of the closure element and the contact element on the headliner part.

The electrical element of the closure element is preferably a solar generator, while the vehicle-mounted electrical element is preferably the motor vehicle battery or a fan. The closure element is made preferably as a opaque cover which can be moved in the lengthwise direction of the roof and which can be raised at its rear edge.

The coupling element is preferably made as a catch and comprises preferably two pairs of a driving pin and a driving catch part. Each pair is located near one of the two side edges of the closure element in the vicinity of the front end of the closure element, i.e., in the vicinity of the pivot about which the cover is raised during the raising motion, in order to keep the relative motion between the driving pin and the corresponding driving catch part low.

Electrical contact of the coupling element is preferably formed by a respective contact surface on each driving pin and a contact surface which engages it in the locked state of the coupling element on the driving catch part. Each pole of the electrical element of the closure element is connected via a cable to the contact surface of one of the two driving pins, the contact surface of each driving catch part being connected via a cable to a sliding contact which is mounted on the headliner part and which can be moved in electrical contact along a roof-mounted slide rail on each side of the roof opening, each of which is electrically connected to a respective pole of the vehicle-mounted electrical element.

One embodiment of the invention is explained by way of example below using the attached drawings.

DETAILED DESCRIPTION OF THE INVENTION

Figure 1:
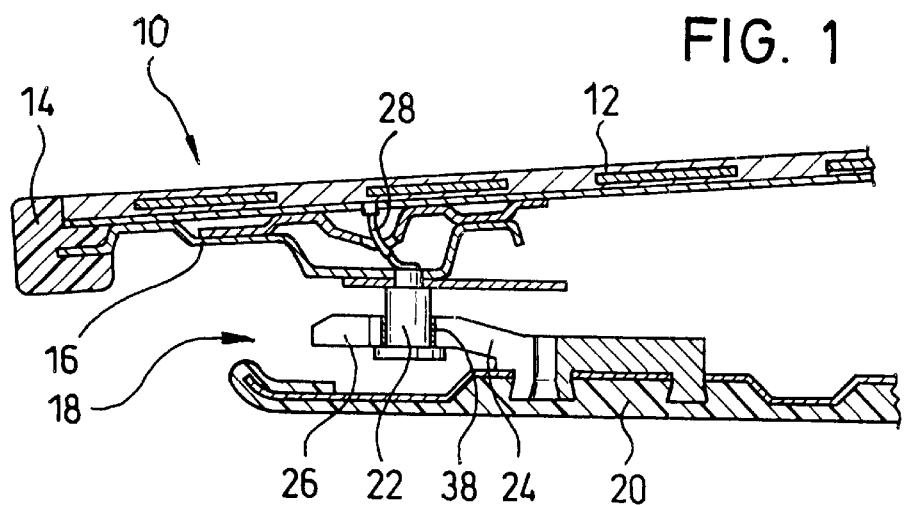
FIG. 1 is a lengthwise section through the front area of the cover and the headliner part of a motor vehicle roof in accordance with the invention.
Figure 2:
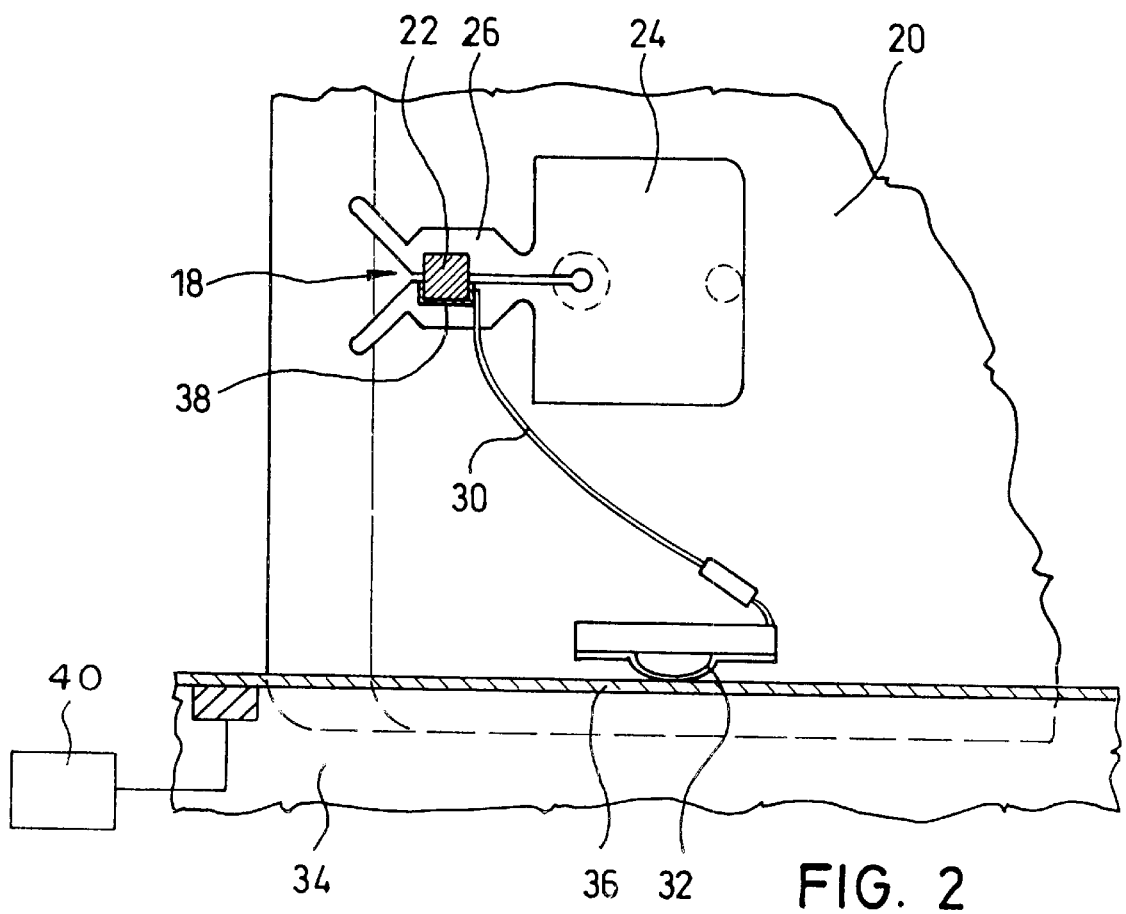
FIG. 2 is a plan view of the front area of the headliner part from FIG. 1.

As shown in FIGS. 1 & 2, the cover 10 has a solar generator 12 on its top surface. The opaque cover 10 of a sliding and lifting roof is provided to close or selectively expose the roof opening in the fixed roof skin, and for this purpose, can be moved in the lengthwise direction of the roof and is supported so that its rear edge is raisable above a roof-mounted frame. The periphery of the cover 10 is foamed with a foam 14 by means of which the inner cover sheet 16 is attached to the bottom edge area of the cover. The cover 10 is generally opaque. Near the pivot about which the cover 10 is raised, near each of the two side edges of the cover 10 in the vicinity of the front end of the cover 10, there is a coupling element 18 by which the cover 10 is coupled to a sliding headliner 20 for displacing it with the cover. Each coupling element 18 is made as a catch and comprises a driving pin 22 which is attached to the inner cover sheet 16 and is electrically connected via a cable 28 to the solar generator 12, and a driving catch part, e.g., a headliner transport hook 24, which is attached to the sliding headliner 20. The headliner transport hook 24 has a forked front end 26 with a corresponding recess for the driving pin 22 and is made of an elastic material, preferably plastic.

The driving pin 22 is provided on its outside with a contact sheet which is connected to one pole of the solar generator 12 via a cable. A recess is provided for the driving pin 22 in the front end 26 of the headliner transport hook 24 and it is, likewise, provided with a contact sheet 38. Contact sheet 38 is connected via a cable 30 to a contact spring steel sheet 32 which is attached to a side edge area of the sliding headliner 20. At each side of the roof opening, the cover 10 is guided laterally in a roof-mounted guide rail 34 which also has a slide rail 36, with reference to which the contact spring steel sheet 32 acts as a sliding contact which can be moved in electrical contact along the slide rail 36 in the lengthwise direction of the roof. The slide rail 36 is electrically connected to one pole of a vehicle-mounted electrical consumer, for example, an electric fan or the motor vehicle battery 40.

When the sliding headliner 20 is installed on the cover 10, the driving pin 22 is locked in the corresponding recess of the headliner transport hook 24, the contact sheets of the driving pin 22 and the headliner transport hook 24 coming into electrical contact with one another, and thus, electrically connect the respective pole of the solar generator 12 to the corresponding sliding contact 32. In this way, the electric power generated by the solar generator 12 can be supplied via the two sliding action rails 36 to the vehicle-mounted electrical consumer independently of the position of the cover 10.

By means of the catch, the coupling elements 18 act as drivers to entrain the sliding headliner 20 during the adjustment motion of the cover 10. Moreover, the coupling elements 18 are also used as electrical contact elements between the cover 10 and the sliding head line 20.

In the described embodiment, it is advantageous that electrical contact is possible between the solar generator 12 and the vehicle-mounted electrical consumer without disruptively dragging along cables to all cover positions. When the sliding headliner 20 is installed, the contact sheets of the driving pin 22 and of the headliner transport hook 24 are automatically engaged. Based on the arrangement of the coupling elements 18 in the vicinity of the pivot of the cover 10, during raising motion, the motion of the individual parts relative to one another is slight. Compensation for motion of the contact parts is therefore not necessary.

What is claimed is:

1. Motor vehicle roof with a roof opening which can be closed or at least partially exposed by a displaceable closure element which has an electrical element, a displaceable headliner part for concealing the closure element, and at least one coupling element which acts as a driver in order to entrain the headliner part for sliding movement during sliding displacement of the closure element, and a contact element which is provided on the headliner part which makes electrical contact with the electrical element of the closure element for establishing continuous, position independent electrical contact between the electrical element of the closure element and a vehicle-mounted electrical element.

2. Motor vehicle roof as claimed in claim 1, wherein the electrical element of the closure element is a solar generator.

3. Motor vehicle roof as claimed in claim 2, wherein the vehicle-mounted electrical element is one of a vehicle battery and a fan.

4. Motor vehicle roof as claimed in claim 2, wherein the closure element is opaque.

5. Motor vehicle roof as claimed in claim 4, wherein the closure element is movable in a lengthwise direction of the roof.

6. Motor vehicle roof as claimed in claim 5, wherein the closure element is raisable and movable to the rear.

7. Motor vehicle roof as claimed in claim 1, wherein said at least one coupling element is made as a catch.

8. Motor vehicle roof as claimed in claim 7, wherein the catch is formed of two coupling elements, one of which is a driving pin and the other of which is driving catch part.

9. Motor vehicle roof as claimed in claim 8, wherein each coupling element is located near one of two side edges of the closure element in the vicinity of a front end of the closure element.

10. Motor vehicle roof as claimed in claim 8, wherein electrical contact of each coupling element is formed by a contact surface on each driving pin and a contact surface on the driving catch part which engages the contact surface of the driving pin in an engaged state of the coupling element.

11. Motor vehicle roof as claimed in claim 10, wherein at least one of the contact surfaces is a sheet.

12. Motor vehicle roof as claimed in claim 8, wherein the driving pin is mounted on the closure element and the driving catch part is mounted on the headliner part.

13. Motor vehicle roof as claimed in claim 12, wherein the electrical element of the closure element is connected via a cable to a contact surface of the driving pin.

14. Motor vehicle roof with a roof opening which can be closed or at least partially exposed by a displaceable closure element which has an electrical element, a displaceable headliner part for concealing the closure element, and at least one coupling element which acts as a driver in order to entrain the headliner part for sliding movement during sliding displacement of the closure element, and a contact element which is provided on the headliner part which makes electrical contact with the electrical element of the closure element for establishing electrical contact between the electrical element of the closure element and a vehicle-mounted electrical element; wherein the contact surface of each driving catch part is connected via a cable to a respective sliding contact which is mounted on the headliner part and which is movable in electrical contact along a roof-mounted slide rail which is electrically connected to a respective pole of the vehicle-mounted electrical element.

15. Motor vehicle roof as claimed in claim 14, wherein each sliding contact is made of a spring steel sheet.

* * * * *